(12) United States Patent
Tucker

(10) Patent No.: US 7,013,346 B1
(45) Date of Patent: Mar. 14, 2006

(54) CONNECTIONLESS PROTOCOL

(75) Inventor: Rusty Tucker, Pleasanton, CA (US)

(73) Assignee: Apple Computer, Inc., Cupertino, CA (US)

( * ) Notice: Subject to any disclaimer, the term of this patent is extended or adjusted under 35 U.S.C. 154(b) by 659 days.

(21) Appl. No.: 09/680,990

(22) Filed: Oct. 6, 2000

(51) Int. Cl.
*G06F 15/16* (2006.01)

(52) U.S. Cl. ............ 709/236; 709/203; 709/230; 709/235; 370/229; 370/230; 370/231; 370/235; 370/236

(58) Field of Classification Search ............ 709/230, 709/231–235, 236, 238, 250, 237, 247, 249; 345/629, 631, 635; 370/400, 401
See application file for complete search history.

(56) References Cited

U.S. PATENT DOCUMENTS

| | | | |
|---|---|---|---|
| 5,036,518 A | | 7/1991 | Tseung |
| 5,751,970 A | * | 5/1998 | Bournas .................... 709/236 |
| 5,768,533 A | * | 6/1998 | Ran ........................ 709/247 |
| 5,905,871 A | * | 5/1999 | Buskens et al. ............ 709/238 |
| 6,014,707 A | * | 1/2000 | Miller et al. ............... 709/232 |
| 6,038,606 A | * | 3/2000 | Brooks et al. .............. 709/235 |
| 6,125,398 A | * | 9/2000 | Mirashrafi et al. ......... 709/236 |
| 6,192,412 B1 | * | 2/2001 | Cantoral et al. ........... 709/236 |
| 6,201,791 B1 | * | 3/2001 | Bournas .................... 370/234 |
| 6,212,171 B1 | * | 4/2001 | LaFollette et al. .......... 370/257 |
| 6,236,642 B1 | * | 5/2001 | Shaffer et al. ............. 370/400 |
| 6,247,058 B1 | * | 6/2001 | Miller et al. ............... 709/234 |
| 6,252,848 B1 | * | 6/2001 | Skirmont .................. 370/229 |
| 6,452,579 B1 | * | 9/2002 | Itoh et al. .................. 345/100 |
| 6,473,425 B1 | * | 10/2002 | Bellaton et al. ............ 370/392 |
| 6,501,441 B1 | * | 12/2002 | Ludtke et al. ............. 345/660 |
| 6,505,253 B1 | * | 1/2003 | Chiu et al. ................. 709/235 |
| 6,564,267 B1 | * | 5/2003 | Lindsay .................... 709/250 |
| 6,574,668 B1 | * | 6/2003 | Gubbi et al. ............... 709/237 |
| 6,593,937 B1 | * | 7/2003 | Ludtke et al. ............. 345/629 |
| 6,611,495 B1 | * | 8/2003 | Meyer et al. ............ 370/230.1 |
| 6,621,799 B1 | * | 9/2003 | Kemp et al. ............... 709/237 |
| 6,750,841 B1 | * | 6/2004 | Itoh et al. .................. 345/100 |

FOREIGN PATENT DOCUMENTS

| | | |
|---|---|---|
| EP | 0 682425 A2 | 11/1995 |
| EP | 0 768 806 A2 | 4/1997 |
| WO | WO 00/21262 | 4/2000 |

OTHER PUBLICATIONS

Inwhee Joe, "A novel adaptive hybrid ARQ scheme for wireless ATM networks", ACM/IEEE MobiCom '97 Conference, Budapest Hungary, Sep. 1997, pp. 211-219.

"Auxiliary Timeout and Selective Packet Discard Schemes to Improve TCP Performance in PCN Environment"; IEEE US, Jun. 8, 1997, Chun, et al., pp. 381-385.

"Protocols For Large Data Transfers Over Local Networks", IEEE Computer Society Press, US, Sep. 1, 1995, Willy Zwaenepoel, pp. 22-32.

* cited by examiner

*Primary Examiner*—Ario Etienne
*Assistant Examiner*—Ramy M Osman
(74) *Attorney, Agent, or Firm*—Buchanan Ingersoll PC

(57) ABSTRACT

Packets transmitted from a server into a computer network are assigned a sequence number, a retransmit time and a time to live. Each packet is retransmitted upon the expiration of the retransmit time if no acknowledgment has been received from a client to which the packet was sent. The packet is removed from a retransmit buffer if the time to live timer expires prior to any acknowledgment being received. Multiple acknowledgments may be combined into a coalesced acknowledgment.

36 Claims, 2 Drawing Sheets

| PACKET | RTO | TTL | SEQ | ACK |
|---|---|---|---|---|
| A | $t_{1a}$ | $t_{2a}$ | 0000 | |
| B | $t_{1b}$ | $t_{2b}$ | 0001 | |
| C | $t_{1c}$ | $t_{2c}$ | 0010 | |
| ⋮ | ⋮ | ⋮ | ⋮ | | ns # CONNECTIONLESS PROTOCOL

FIELD OF INVENTION

The present invention relates generally to protocols for the transmission of packets over a computer network, and more particularly, to an improved connectionless protocol.

BACKGROUND OF THE INVENTION

In a computer network in which a plurality of clients communicate with one or more servers, a protocol is necessary to establish the rules by which the information is transmitted to effect such communication. Generally, the information is sent from the server in successive packets of information, with each of the packets transversing their own paths through the network, until such time as the packets are reassembled at the destination client. To establish the communication, each packet contains, in addition to a data segment of the total information to be sent, the source address of the server in the network and the destination address of the client in the network.

A commonly used protocol used to establish these connections is the Transmission Control Protocol ("TCP"). TCP is used along with the Internet Protocol ("IP") to send data in the form of message units between computers over the Internet. While IP takes care of handling the actual delivery of the data, TCP takes care of keeping track of the packets that a message is divided into for efficient routing through the Internet.

For example, when an HTML file is sent from a web server, the TCP program layer in that server divides the file into one or more packets, numbers the packets, and then forwards them individually to the IP program layer. Although each packet has the same destination IP address, each packet may get routed differently through the network. At the client, TCP reassembles the individual packets and waits until they have arrived to display the re-assembled HTML file.

TCP is also known as a connection-oriented protocol, which means that a connection is established and maintained until such time as the message or messages to be exchanged by the application programs at each end of the connection have been exchanged. TCP is responsible for ensuring that a message is divided into the packets that IP manages and for reassembling the packets back into the complete message at the other end.

Another protocol to transmit information is the User Datagram Protocol ("UDP"). UDP is a communications method that offers a limited amount of service when messages are exchanged between computers in a network that uses IP. UDP is an alternative to TCP and, together with IP, is sometimes referred to as UDP/IP. Like TCP, UDP uses the IP to actually get a data unit, or datagram, from one computer to another.

Unlike TCP, however, UDP does not provide the service of dividing a message into packets or datagrams, and reassembling them at the other end. Specifically, UDP does not provide sequencing of the packets that the data arrives in. Accordingly, the application program that uses UDP must be able to ascertain that the entire message has arrived and is in the right order. Network applications that want to save processing time because they have very small data units to exchange (and therefore very little message reassembling to do) may usually use UDP instead of TCP. UDP does provide two services not provided by the IP layer. It provides a port number to help distinguish different user requests and, optionally, a checksum capability to verify that the data arrived intact.

For streaming applications over a computer network, both UDP and TCP have significant disadvantages and limitations. For example, since TCP requires that all packets are received prior to reassembly at the client, any missing packets could cause the streaming application running at the client to be paused due to the lack of data. UDP also requires that all of the packets are received and also received in the right order, since there is no sequencing of the packets. For a large number of packets in a streaming application, the packets may arrive out of order, resulting in degradation of the output of the streaming application.

Other features of TCP further disadvantageously limit the ability to deliver packets for streaming applications in a timely manner. For example, TCP requires that each packet sent in the stream must be received and each packet delivered to the client in the order sent. This requirement of TCP is especially limiting and disadvantageous for a streaming application. If the server sends four sequential packets, and packet 1 is lost, the client running the streaming application cannot receive the remaining three packets from the TCP protocol stack until it receives the first packet. If the client receives the first packet sufficiently late, all the previously received packets may be useless due to the tardy reception. In any event, the output of the streaming application will be degraded or possibly halted.

There is therefore needed a connectionless protocol which overcomes one or more disadvantages and limitations of the prior art herein above enumerated.

SUMMARY OF THE INVENTION

It is an object of the present invention to overcome one or more disadvantages and limitations of the prior art herein above enumerated.

It is an object of the present invention to provide a conectionless protocol which does not require receipt of all packets by the client, nor require receipt of packets in order of transmission.

According to one aspect of the present invention, a method for real time transmission of information content between a network server and a network client comprises the steps of transmitting successive packets of the content from the server to a retransmit module, assigning at the retransmit module to each of the packets a sequence number and a first timer, transmitting further each of the packets from the retransmit module to the network client, transmitting from the network client to the retransmit module an acknowledgment for each of the packets received at the network client, retransmitting from the retransmit module any of the packets upon expiration of the first timer assigned thereto prior to an acknowledgment for the any one of the packets being received, and removing from the retransmit module any of the packets upon an event determination prior to an acknowledgement for such anyone of the packets being received.

In a second aspect of the present invention, a method for acknowledging receipt of packets sent from a network server to a network client comprises steps of transmitting successively packets from the server, receiving at the client several of the packets, placing into a coalesced acknowledgment an ID of a first one of the several of the packets received at the client, adding to the coalesced acknowledgment a bit map identifying selected other ones of the several of the packets received at the client, and transmitting to the server the coalesced acknowledgment.

Features of the present invention are flow control, congestion avoidance and packet recovery without any necessity for guaranteed or in order delivery. Flow control is achieved by limiting the amount of unacknowledged data to a given window size. When the window is full, further transmission is delayed until packets are acknowledge or expired. A slow start algorithm is also provided to adapt the rate of packet transmission to the client. Congestion is avoided by using the TCP exponential back off. Robust packet recovery is obtained by using Karn's algorithm for round trip estimation. The order of packet deliver is not required nor guaranteed. Acknowledgments are sent on a packet by packet basis. In another embodiment of the invention, acknowledgments may be coalesced.

These and other objects, advantages and features of the present invention will become readily apparent to those skilled in the art from a study of the following Description of the Exemplary Preferred Embodiments when read in conjunction with the attached Drawing and appended claims.

DESCRIPTION OF THE EXEMPLARY PREFERRED EMBODIMENTS

Figures 1, 2:
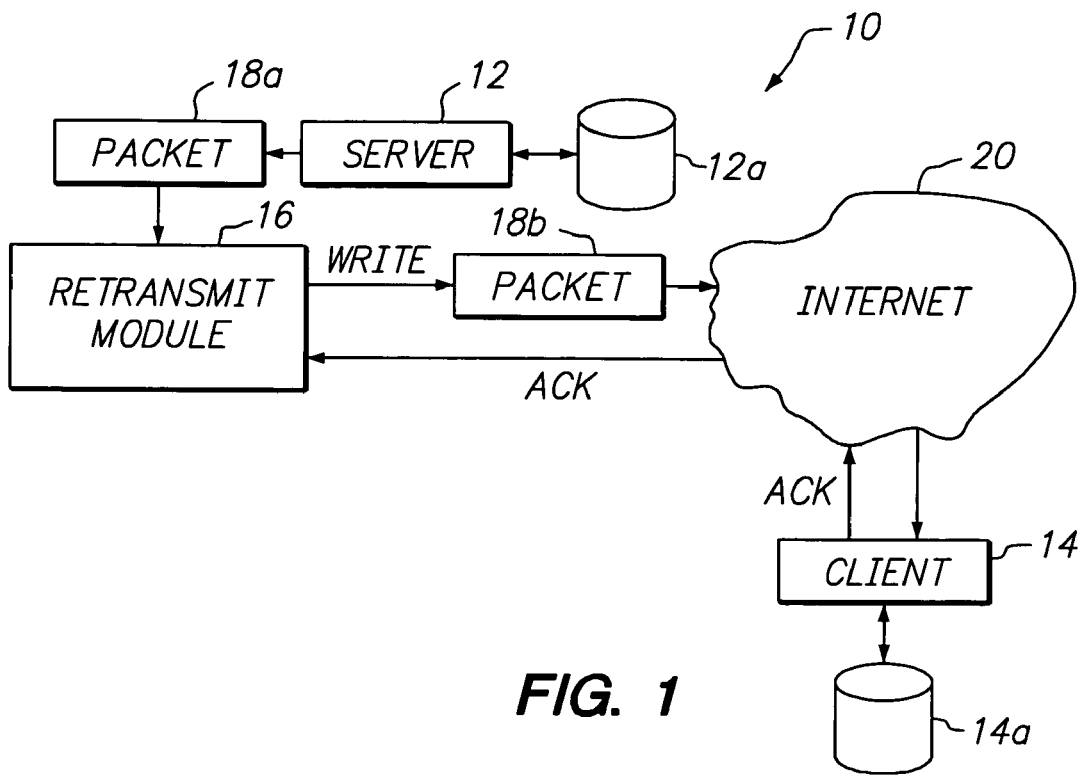
FIG. 1 is a schematic block diagram of a computer network constructed according to the principles of the present invention.
FIG. 2 is a table useful to describe the function of the retransmit module of FIG. 1.

With reference to FIG. 1, there is shown a network 10 including a server 12, a client 14, and a retransmit module 16. The server is adapted to send successive packets, such as packets 18a, 18b, into the network 10. The client 14 is adapted to receive such packets 18a, 18b, from the network 10. As is known, the packets 18a and 18b may traverse differing paths through the Internet 20, which may also be part of the network 10. Each of the server 12 and client 14 respectively has a computer readable medium 12a, 14a in which a program is stored which implements the below described inventive procedures, processes and methods.

Figure 3:
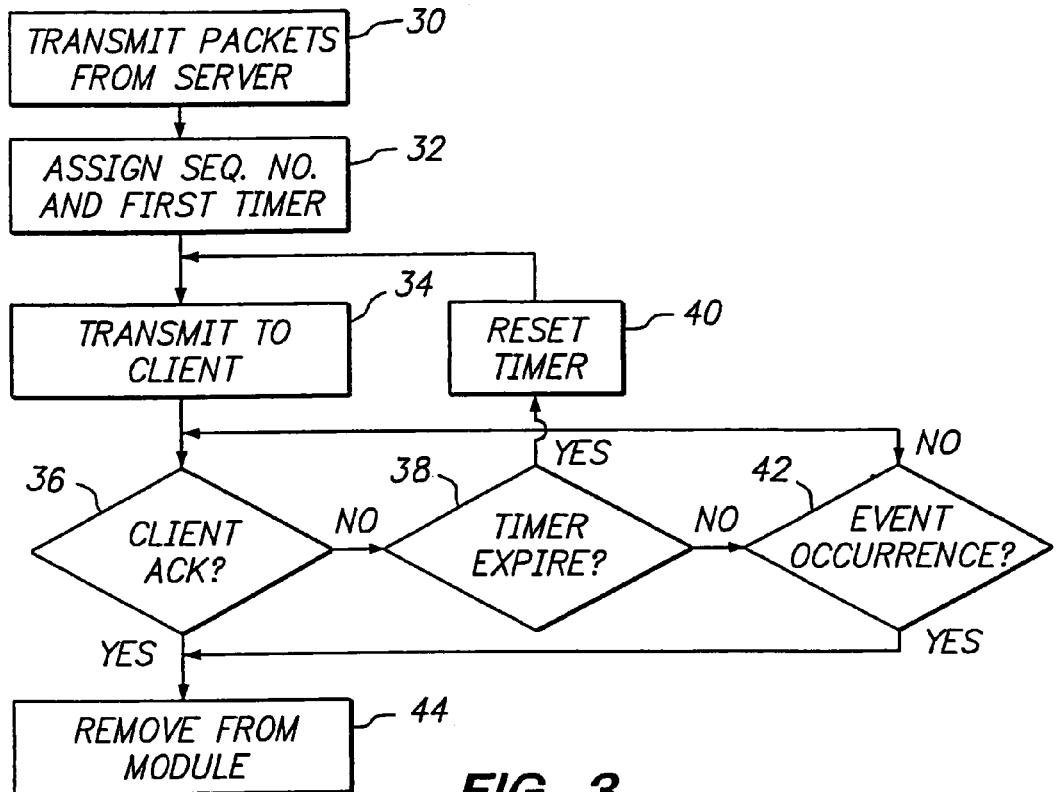
FIG. 3 is a flow chart useful to describe one method of the present invention.

In accordance with the present invention, the packets are first sent from the server to the retransmit module 16 as seen at 30, 32 in FIG. 3. The retransmit module 16 assigns a sequence number or ID to each packet, a first timer and second timer as best seen in the table of FIG. 2. The first timer establishes a first time duration, or retransmit time, upon the expiration of which the packet 18a, 18b to which it is assigned is retransmitted. The second timer establishes a "time to live" for the packet 18a, 18b, to which it is assigned. Upon expiration of the second timer, the packet 18a, 18b to which it is assigned is removed from the retransmit module 16 even if no acknowledgement for receipt of such packet 18a, 18b has been received.

When the packets 18a, 18b are sent to the retransmit module, they are retained therein, as well as transmitted through the network 10 as seen at 34 in FIG. 3. If an acknowledgment (ACK) is not returned as indicated in 36 to the retransmit module 16 for any of the packets 18a, 18b, prior to the expiration of the first timer associated therewith, indicated at 38, such packet 18a, 18b will be retransmitted, and the first timer for the retransmit time may also be reset as indicated at 40.

Although it has been described above that, if an acknowledgment is not received for such packet 18a, 18b prior to the expiration of the second timer for the time to live, the packet will be removed from the retransmit module 16, several other methods or procedures may be utilized. For example, the packet 18a, 18b may be removed from the retransmit module upon the occurance of a predetermined event prior to receipt of any acknowledgement therefor as indicated at 42. Such event may be a preselected number of retransmits for such packet 18a, 18b, or the subsequent transmission of another packet containing more critical information, as discussed herein below. If an acknowledgment is received prior to the expiration of either timer, the packet will also be removed from the retransmit module 16, as indicated at 44.

In one embodiment of the present invention, the first timer and the second timer may be assigned on the basis of the criticality of the information contained in the packet. For example in a streaming video application, certain packets may be designated as frame packets necessary for reconstructing an entire video frame at the client 14. Successive packets following the frame packets may then be designated as differential packets, which contain only information which has changed within the frame. Differential packets may then be given shorter time to live than frame packets which contain more valuable information for the streaming application. By allowing packets to expire, the stream of packets keeps moving forward. Rather than retransmit a stale packet, a fresher and potentially more important packet is transmitted in its place. The expiration of the stale packet could be based either on the time to live associated with the second timer, or alternatively, on the event of a subsequent frame packet being transmitted, for example.

In another aspect of the present invention, the stream of packets 18a, 18b, is regulated, or slowly started, to increase the allowable window size so that competing streams can find equilibrium in their transit rate when they are first starting up, and also when a retransmit occurs. This slow start is effective to minimize the number of lost packets by keeping total bandwidth demand within the bandwidth constraints along the path between the server 12 and the client 14.

While a stream is sending, the window size is constrained to the lesser of a "Congestion Window", or CWND and client window sizes. The client window must be advertised using RTSP during protocol negotiation. The size must be no greater than the size of the UDP socket input buffer at the client 14. CWND is initialized to the maximum segment size (MSS).

For each packet 18a, 18b acknowledged by the client, CWND is increased by the sized of the acknowledged packet 18a, 18b. CWND is continually increased for each acknowledgment until the CWND is greater than or equal to a predetermined slow start threshold (SSTH). Once the SSTH is reached, the CWND is increased by the MSS for each window of ACK's.

CWND may be constrained by the MSS at the minimum and the client window size at the maximum. SSTH is maintained by an exponential back off algorithm. It denotes the window size that is last known to be error free. An exemplary code listing for the slow start algorithm is set forth herein in Table 1.

TABLE 1

SAMPLE CODE TO CALCULATE CONGESTION WINDOW:
```
void UpdateCongestionWindo (Sint32 bytesIncreased)
{
    // update the congestion window by the number of bytes just
acknowledged.
    if (fCongestionWindow >= fSlowStartThreshold)
    {
        // when we hit the slow start threshold, only increase the
        // window for each window full of acks.
        fSlowStartByteCount += bytesIncreased;
        // have we exceeded one window full yet?
        if (fSlowStartByteCount > fCongestionWindow)
        {
            fCongestionWindow += kMaximumSegmentSize;
            fSlowStartThreshold += kMaximumSegmentSize;
            fSlowStartByteCount = 0;
        }
    }
    else
        fCongestionWindow += bytesIncreased;
    if (fCongestionWindow > fClientWindow)
        fCongestionWindow = fClientWindow;
}
```

The timer for retransmit time (RTO) is calculated as a modified version of Karn's algorithm used in TCP. The round trip time for each acknowledged packet 18a, 18b is input into an estimator to produce a smoothed round trip time (SRTT) and a running standard deviation (RTTVAR). The retransmit formula is the sum of the smoothed round trip time and four times the standard deviation, or RTO=SRTT+4*RTTVAR. In addition, one and one half times the RTO as a sample of the first retransmit of any given packet may be initially used to prevent spurious retransmits of any packets when the actual round trip time is increasing rapidly. furthermore, acknowledgments for packets that have been retransmitted are usually not used for packets that have been retransmitted. A listing of exemplary code useful for this aspect of the present invention is set forth in Table 2.

TABLE 2

SAMPLE CODE FOR MAKING SRTT AND RTTVAR CALCULATIONS
```
    void AddToEstimate (Sint32 rttSampleMSecs)
    {
*/
    Sint32 delta;
// initialize avg to cur sample, scaled by 2**3
    if (fRunningAverageMSecs == 0)
        fRunningAverageMSecs = rttSamplMSecs * 8;
    // scale average back to get cur delta from sample
    delta = rttSampleMSecs – fRunningAverageMSecs/8
    // add 1/8 the delta back to the smooth runnin average
    //same as : rt avg = rt avg + delta/8, but scaled
    fRunningAverageMSecs = fRunningAverageMSecs + delta;
    if (delta < 0)
        delta = –1*delta; // absolute value
    /*
    fRunningMeanDevationMSecs is kept scaled by 4
    so this is the same as
    fRunningMeanDevationMSecs =
fRunningMeanDevationMSecs + (|delta| –
fRunningMeanDevationMSecs)/4;
        fRunningMeanDevationMSecs += delta –
fRunningMeanDevationMSecs/4;
    */
    fRunningMeanDevationMSecs += delta –
fRunningMeanDevationMSecs/4;
    fCurRetransmitTimeout = fRunningAverageMSecs/8 +
fRunningMeanDevationMSecs;
    // rto should not be too low..
    if (fCurRetransmitTimeout < kMinRetransmitIntervalMsecs)
        fCurRetrasnsmitTimeout = kMinRetrnsmitIntervalMSecs;
```

TABLE 2-continued

```
    // or too high..
    if (fCurRetransmitTimeout > kMaxRetransmitIntervalMSecs)
        fCurRetransmitTimeout = kMaxRetransmitIntervalMSecs;
}
```

An inverse to the above described slow start, is back off to quickly slow and find a new equilibrium when a retransmit of any packet occurs. After a retransmit, SSTH is set to a maximum of one half the current CWND or MSS. After adjusting the SSTH, CWND is set to the MSS. When a stream begins retransmitting, it will not readjust the CWND or SSTH because of subsequent retransmits until either a new packet is sent, or packets are acknowledged. Accordingly, the back off prevents a burst of retransmits from closing the windows to unnecessarily low levels.

The client 14 acknowledges each packet successfully received using an RTCP app packet. A PTCP app packet useful for practicing the above described methods and procedures is exemplary set forth in Table 3.

TABLE 3

SENDING ACKOWLEDGEMENTS -
The client acknowledges each RTP packet successfully received using the following RTCP app packet:

| # bytes | descriptions |
| --- | --- |
| 4 | rtcp header |
| 4 | SSRC of receiver |
| 4 | app type ("AAAA') |
| 2 | reserved (set of 0) |
| 2 | seqNum |

Acknowledgments need not be sent for each packet 18a, 18b received at the client 14, but may be combined into a coalesced acknowledgment. In one embodiment a coalesced acknowledgment may be a four bit bitmap following the sequence number of the first acknowledge packet, such that the coalesced acknowledgment could acknowledge up to 33 packets. A coalesced acknowledgment has the advantage of reducing demand for bandwidth in the client 14 to server 12 direction, and reduce processing load at the server 14.

Coalesced acknowledgments will be sent whenever the bitmap is full, the sequence numbers "wrap" (restarting at the first sequence number) or whenever a selected time, such as 200 ms, have elapse since the previous acknowledgment and the client 14 has unacknowledged packets. This keeps the round-trip time from becoming artificially large, which may result in unneeded retransmits or lower throughput. Furthermore, the client 14 should send an acknowledgment whenever a packet is received out of sequence.

Figure 4:
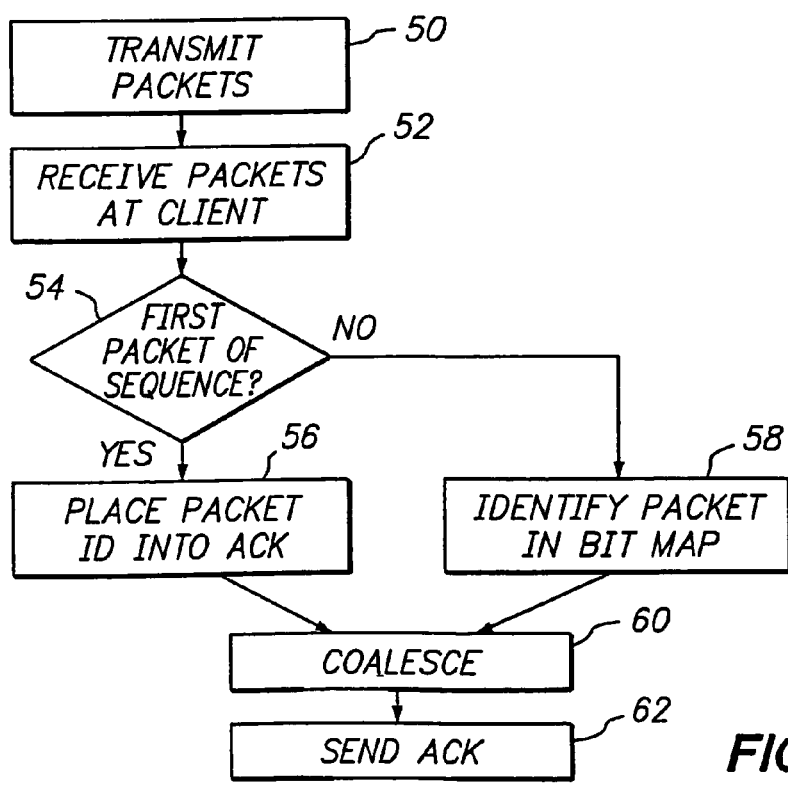
FIG. 4 is a flow chart useful to describe another method of the present invention.

As seen in FIG. 4, the packets may be transmitted and received, as seen at 50, 52. At 54 a determination is made if the received packet is the first of a sequence. If yes, its ID is placed into the acknowledgement, as indicated at 56. If no, the packet is identified in a bitmap, as indicated at 58. If an acknowledgement is then to be sent in accordance with one of the above conditions, the acknowledgement is coalesced, as indicated at 60 and sent to the server 12, as indicated at 62.

There has been described herein above exemplary preferred embodiments of an improved connectionless protocol. Those skilled in the art may now make numerous uses of and departures from the above described embodiments without departing from the inventive concepts disclosed therein. Accordingly, the present invention is to be defined solely by the scope of the appended claims.

What is claimed is:

1. A method for real time transmission of frame-based content between a network server and a network client comprising the steps of:
   designating individual packets of said content as either a frame packet that contains information for reconstructing an entire frame of said content or a differential packet that contains changes to a frame;
   assigning to each of said packets a sequence number and a timer for retransmission retention, wherein the duration of the timers for frame packets is longer than for differential packets;
   transmitting each of said packets to said network client;
   detecting an acknowledgment for one or more packets received at said network client;
   retransmitting any of said packets for which no acknowledgment is detected if their respective timers have not expired; and
   terminating the retention of each packet whose timer has expired, wherein differential packets are removed more frequently than frame packets in order to ensure that critical information is not lost when an acknowledgment is not detected.

2. A method as set forth in claim 1 further comprising terminating the retention of any of said packets upon detecting said acknowledgment for said any of said packets prior to expiration of said timer.

3. A method as set forth in claim 1 further comprising placing said acknowledgment for differing ones of said packets into a coalesced acknowledgment.

4. A method as set forth in claim 1 further comprising:
   maintaining the bandwidth of successively transmitted packets to the lesser of a congestion window initially determined to be maximum segment size and a client window size no greater than the size of a UDP socket input buffer at said client.

5. A method as set forth in claim 4 wherein said congestion window is increased by the size of each packet for which an acknowledgment is received.

6. A method as set forth in claim 5 wherein said congestion window is increased until said congestion window exceeds a predetermined threshold, and increases thereafter by said maximum segment size for each acknowledgment received.

7. A method as set forth in claim 6 wherein said threshold is determined by a window size that is last known to be error free in receipt of said successively transmitted packets.

8. A method as set forth in claim 6 wherein said threshold is, upon retransmitting of any of said packets, set to the greater of ½ of the current congestion window size or maximum segment size.

9. A method as set forth in claim 8 wherein said congestion window is reset to said maximum segment size.

10. A network for real time transmission of frame-based content between a network server and a network client comprising the steps of:
    means for designating individual packets of said content as either a frame packet that contains information for reconstructing an entire frame of said content or a differential packet that contains changes to a frame;
    means for assigning to each of said packets a sequence number and a timer for retransmission retention, wherein the duration of the timers for frame packets is longer than for differential packets;
    means for transmitting each of said packets to said network client;
    means for detecting an acknowledgment for one or more packets received at said network client;
    means for retransmitting any of said packets for which no acknowledgment is detected if their respective timers have not expired; and
    means for terminating the retention of each packet whose timer has expired, wherein differential packets are removed more frequently than frame packets in order to ensure that critical information is not lost when an acknowledgment is not detected.

11. A network as set forth in claim 10 further comprising means for terminating the retention of any of said packets upon detecting said acknowledgment for said any of said packets prior to expiration of said timer.

12. A network as set forth in claim 10 further comprising means for placing said acknowledgment for differing ones of said packets into a coalesced acknowledgment.

13. A network as set forth in claim 10 further comprising:
    means for maintaining the bandwidth of successively transmitted packets to the lesser of a congestion window initially determined to be maximum segment size and a client window size no greater than the size of a UDP socket input buffer at said client.

14. A network as set forth in claim 13 wherein said congestion window is increased by the size of each packet for which an acknowledgment is received.

15. A network as set forth in claim 14 wherein said congestion window is increased until said congestion window exceeds a predetermined threshold, and increases thereafter by said maximum segment size for each acknowledgment received.

16. A network as set forth in claim 15 wherein said threshold is determined by a window size that is last known to be error free in receipt of said successively transmitted packets.

17. A network as set forth in claim 15 wherein said threshold is, upon retransmitting of any of said packets, set to the greater of ½ of the current congestion window size or maximum segment size.

18. A network as set forth in claim 17 wherein said congestion window is reset to said maximum segment size.

19. A computer readable medium containing a program which implements a procedure for real time transmission of frame-based content between a network server and a network client comprising:
    designating individual packets of said content as either a frame packet that contains information for reconstructing an entire frame of said content or a differential packet that contains changes to a frame;
    assigning to each of said packets a sequence number and a timer for retransmission retention, wherein the duration of the timers for frame packets is longer than for differential packets;
    transmitting each of said packets to said network client;
    detecting an acknowledgment for one or more packets received at said network client;
    retransmitting any of said packets for which no acknowledgment is detected if their respective timers have not expired; and
    terminating the retention of each packet whose timer has expired, wherein differential packets are removed more frequently than frame packets in order to ensure that critical information is not lost when an acknowledgment is not detected.

20. A computer readable medium as set forth in claim 19 further comprising terminating the retention of any of said packets upon detecting said acknowledgment for said any one of said packets prior to expiration of said timer.

21. A computer readable medium as set forth in claim 19 further comprising placing said acknowledgment for differing ones of said packets into a coalesced acknowledgment.

22. A computer readable medium as set forth in claim 19 further comprising:
   maintaining the bandwidth of successively transmitted packets to the lesser of a congestion window initially determined to be maximum segment size and a client window size no greater than the size of a UDP socket input buffer at said client.

23. A computer readable medium as set forth in claim 22 wherein said congestion window is increased by the size of each packet for which an acknowledgment is received.

24. A computer readable medium as set forth in claim 23 wherein said congestion window is increased until said congestion window exceeds a predetermined threshold, and increases thereafter by said maximum segment size for each acknowledgment received.

25. A computer readable medium as set forth in claim 24 wherein said threshold is determined by a window size that is last known to be error free in receipt of said successively transmitted packets.

26. A computer readable medium as set forth in claim 24 wherein said threshold is, upon retransmitting of any of said packets, set to the greater of ½ of the current congestion window size or maximum segment size.

27. A computer readable medium as set forth in claim 26 wherein said congestion window is reset to said maximum segment size.

28. A computer network comprising:
   a server operative to send successive packets of frame-based content into said network;
   a network client which receives said packets from said network;
   a retransmit module responsive to said packets sent by said server to assign to each of said packets a sequence number and a timer for retention by said module and to designate said packet as one of a frame packet and a differential packet based upon whether said packet contains information for reconstructing an entire frame of said content, said network client transmitting to said retransmit module an acknowledgment for one or more packets received at said network client, said retransmit module retransmitting selected packets in the absence of an acknowledgment for said selected packets, and
   said retransmit module further removing any of said packets upon expiration of said timer assigned thereto wherein said differential packets are removed after a shorter time period than frame packets in order to ensure that critical information is not lost when an acknowledgment is not received.

29. A network as set forth in claim 28 wherein said retransmit module removes packets upon receipt of an acknowledgment for said packets prior to expiration of said timer.

30. A network as set forth in claim 28 wherein said client is further adapted to place said acknowledgment for differing ones of said packets into a coalesced acknowledgment.

31. A network as set forth in claim 28 wherein said server further maintains a bandwidth of successively transmitted packets to the lesser of a congestion window initially determined to be maximum segment size and a client window size no greater than the size of a UDP socket input buffer at said client.

32. A network as set forth in claim 31 wherein said congestion window is increased by the size of each packet for which an acknowledgment is received.

33. A network as set forth in claim 32 wherein said congestion window is increased until said congestion window exceeds a predetermined threshold, and increases thereafter by said maximum segment size for each acknowledgment received.

34. A network as set forth in claim 33 wherein said threshold is determined by a window size that is last known to be error free in receipt of said successively transmitted packets.

35. A network as set forth in claim 33 wherein said threshold is, upon retransmitting of any of said packets, set to the greater of ½ of the current congestion window size or maximum segment size.

36. A network as set forth in claim 35 wherein said congestion window is reset to said maximum segment size.

* * * * *